(12) United States Patent
He (10) Patent No.: US 10,855,796 B2
(45) Date of Patent: Dec. 1, 2020

(54) DATA STORAGE METHOD AND DEVICE

(71) Applicant: ADVANCED NEW TECHNOLOGIES CO., LTD., Grand Cayman (KY)

(72) Inventor: Li He, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/217,974

(22) Filed: Dec. 12, 2018

(65) Prior Publication Data

US 2019/0124176 A1 Apr. 25, 2019

Related U.S. Application Data

(63) Continuation of application No. PCT/CN2017/088589, filed on Jun. 16, 2017.

(30) Foreign Application Priority Data

Jun. 28, 2016 (CN) .......................... 2016 1 0491303

(51) Int. Cl.
*H04L 29/08* (2006.01)
*G06F 16/00* (2019.01)
(Continued)

(52) U.S. Cl.
CPC .......... *H04L 67/2842* (2013.01); *G06F 9/44* (2013.01); *G06F 16/00* (2019.01);
(Continued)

(58) Field of Classification Search
CPC .... G06F 16/986; H04L 67/02; H04L 67/2842
See application file for complete search history.

(56) References Cited

U.S. PATENT DOCUMENTS 7,464,381 B1 12/2008 Nickerson et al.
7,490,141 B1 2/2009 Cammarata et al.
(Continued)

FOREIGN PATENT DOCUMENTS

CN 101075240 A 11/2007
CN 101615179 B 8/2011
(Continued)

OTHER PUBLICATIONS

First Search dated Jan. 30, 2018, issued in related Chinese Application No. CN201610491303.7 (1 page).
(Continued)

*Primary Examiner* — Joe Chacko (57) ABSTRACT

The present disclosure provides a data storage method and device, wherein the method comprises: invoking a local storage interface of a browser, and storing application data to a storage space under a domain name corresponding to a current page, the domain name supporting a generic domain name; when the storage space under the domain name is insufficient to store the application data, creating at least one iframe, each iframe loading a proxy page corresponding to a sub-domain name under the domain name; and storing remaining application data in an additional storage space corresponding to the at least one sub-domain name. The method allows the local storage of a browser to meet the data storage demand of various capacities.

17 Claims, 2 Drawing Sheets

(51) Int. Cl.
   *G06F 9/44* (2018.01)
   *G06F 16/957* (2019.01)
   *G06F 16/958* (2019.01)
(52) U.S. Cl.
   CPC ........ *G06F 16/9574* (2019.01); *G06F 16/986* (2019.01); *H04L 67/02* (2013.01)

(56) References Cited

U.S. PATENT DOCUMENTS

| | | | |
|---|---|---|---|
| 7,523,158 | B1 | 4/2009 | Nickerson et al. |
| 7,979,791 | B2 | 7/2011 | Yang et al. |
| 8,209,706 | B2 | 6/2012 | Corvera et al. |
| 8,423,651 | B1 | 4/2013 | Grieve et al. |
| 8,719,421 | B2 | 5/2014 | Mao et al. |
| 9,740,672 | B2 | 8/2017 | Ross et al. |
| 2007/0101258 | A1* | 5/2007 | Xu .................. G06F 16/972 715/234 |
| 2008/0270527 | A1 | 10/2008 | Krabach et al. |
| 2009/0327421 | A1 | 12/2009 | Fu et al. |
| 2012/0036264 | A1* | 2/2012 | Jiang ................. G06F 16/9574 709/226 |
| 2013/0076797 | A1 | 3/2013 | Hou |
| 2014/0013244 | A1 | 1/2014 | Lindsay et al. |
| 2014/0223453 | A1 | 8/2014 | Li et al. |
| 2015/0067476 | A1 | 3/2015 | Song et al. |
| 2015/0312345 | A1 | 10/2015 | Funane |
| 2016/0117297 | A1* | 4/2016 | Ross .................. G06F 40/154 715/241 |
| 2017/0078429 | A1 | 3/2017 | Toussaint et al. |

FOREIGN PATENT DOCUMENTS

| | | |
|---|---|---|
| CN | 102307220 A | 1/2012 |
| CN | 103246667 A | 8/2013 |
| CN | 104111829 A | 10/2014 |
| CN | 102761628 A | 12/2014 |
| CN | 102761628 B | 12/2014 |
| JP | 2013-003622 A | 1/2013 |
| JP | 2015-215859 A | 12/2015 |
| TW | 201324322 A | 6/2013 |
| TW | 201403363 A | 1/2014 |
| TW | 201514845 A | 4/2015 |

OTHER PUBLICATIONS

Supplementary Search dated Sep. 7, 2018, issued in related Chinese Application No. 201610491303.7 (1 page).
First Office Action dated Apr. 2, 2018, issued in related Chinese Application No. 201610491303.7 (6 pages).
Second Office Action dated Sep. 18, 2018, issued in related Chinese Application No. 201610491303.7 (14 pages).
PCT International Search Report and the Written Opinion dated Sep. 19, 2017, issued in related International Application No. PCT/CN2017/088589 (9 pages).
PCT International Preliminary Report on Patentability dated Jan. 10, 2019, issued in related International Application No. PCT/CN2017/088589 (12 pages).
Third Office Action dated Jan. 9, 2019, issued in related Chinese Application No. 201610491303.7 (15 pages), with English machine translation.
Decision of Grant for Taiwanese Patent Application No. 106112251, dated Jan. 28, 2019, 3 pages.
Search Report for European Application No. 17819118.5 dated Dec. 5, 2019 (8 pages).
Notice of Reasons for Refusal for Japanese Application No. 2018568336 dated Feb. 4, 2020 with English machine translation (8 pages).

* cited by examiner

DATA STORAGE METHOD AND DEVICE

CROSS-REFERENCE TO RELATED APPLICATIONS

The present application is a continuation application of International Patent Application No. PCT/CN2017/088589, filed on Jun. 16, 2017, which is based on and claims priority to and benefits of Chinese Patent Application No. 201610491303.7 filed with the State Intellectual Property Office (SIPO) of the People's Republic of China on Jun. 28, 2016. The entire contents of the above-identified applications are incorporated herein by reference.

TECHNICAL FIELD

The present disclosure relates to computer technologies, and in particular, to a data storage method and device.

BACKGROUND

When some pages are loaded and run in a browser, resources required for displaying the pages can be stored in a local storage space of the browser, such that the resources can be acquired locally for next time running. For example, when developing a Web application that supports offline operations, resource files required by offline operations of the application can be downloaded and stored in a local storage space when the browser is online. When a user accesses the application offline, the resource files can be acquired locally and automatically loaded, such that the user can normally use the application offline. However, all current major browsers have limits on local storage spaces and typically limit local storage spaces through domain names. For example, a local storage space corresponding to a domain name can be 5 MB, which cannot meet the demand by large offline Web applications for local storage of mass data.

SUMMARY

In view of the foregoing, the present disclosure provides a data storage method and device, enabling a browser's local storage to meet the data storage demand of various capacities.

For example, the present disclosure is achieved with the following technical solutions:

A first aspect of the present disclosure provides a data storage method. The method may include invoking a storage interface of a browser, and storing application data associated with displaying a page by the browser to a storage space under a domain name corresponding to the page; when the storage space under the domain name is insufficient to store the application data, creating at least one HTML frame (iframe), each iframe loading one proxy page, each proxy page corresponding to one sub-domain name under a generic domain name; and storing remaining application data in an additional storage space corresponding to the one sub-domain name.

Optionally, the method may include creating a first iframe. The first iframe may load a first proxy page, and the first proxy page may correspond to a first sub-domain name under the generic domain name. When a first additional storage space corresponding to the first sub-domain name is still insufficient to store the remaining application data, the method may further include creating a second iframe, and the second iframe may load a second proxy page corresponding to a second sub-domain name under the generic domain name.

Optionally, the method may further include acquiring the application data from the storage space under the domain name and the additional storage space corresponding to the one sub-domain name when the stored application data is to be loaded into the browser.

A second aspect of the present disclosure provides a data storage device. In one embodiment, the data storage device includes a data storage module and a page creating module. The data storage module is configured to invoke a local storage interface of a browser, and store application data to a storage space under a domain name corresponding to a current page that the browser is displaying. When the storage space under the domain name is insufficient to store the application data, the data storage module is further configured to store remaining application data in an additional storage space corresponding to at least one sub-domain name created by the page creating module. According to one embodiment, the page creating module is configured to create, when the storage space under the domain name is insufficient to store the application data, at least one HTML frame (iframe), each iframe loading a page corresponding to a sub-domain name under a generic domain name.

A third aspect provides a non-transitory computer-readable storage medium, storing instructions executable by one or more processors to cause the one or more processors to perform a method. The method may include invoking a storage interface of a browser, and storing application data associated with displaying a page by the browser to a storage space under a domain name corresponding to the page; when the storage space under the domain name is insufficient to store the application data, creating at least one HTML frame (iframe), each iframe loading one proxy page, each proxy page corresponding to one sub-domain name under a generic domain name; and storing remaining application data in an additional storage space corresponding to the one sub-domain name.

Optionally, the method may include creating a first iframe. The first iframe may load a first proxy page, and the first proxy page may correspond to a first sub-domain name under the generic domain name. When a first additional storage space corresponding to the first sub-domain name is still insufficient to store the remaining application data, the method may further include creating a second iframe, and the second iframe may load a second proxy page corresponding to a second sub-domain name under the generic domain name.

Optionally, the method may further include acquiring the application data from the storage space under the domain name and the additional storage space corresponding to the one sub-domain name when the stored application data is to be loaded into the browser.

A fourth aspect of the present disclosure provides a data storage system, comprising a processor and a non-transitory computer-readable storage medium coupled to the processor and having instructions stored thereon, the instructions being executable by the processor to cause the system to perform operations comprising: invoking a storage interface of a browser, and storing application data associated with displaying a page by the browser to a storage space under a domain name corresponding to the page; when the storage space under the domain name is insufficient to store the application data, creating at least one HTML frame (iframe), each iframe loading one proxy page, each proxy page corresponding to one sub-domain name under a generic domain name; and storing remaining application data in an additional storage space corresponding to the one sub-domain name.

Optionally, the instructions may cause the system to perform an operation of creating a first iframe. The first iframe may load a first proxy page, and the first proxy page may correspond to a first sub-domain name under the generic domain name. When a first additional storage space corresponding to the first sub-domain name is still insufficient to store the remaining application data, the instructions may cause the system to further perform creating a second iframe, and the second iframe may load a second proxy page corresponding to a second sub-domain name under the generic domain name.

Optionally, the instructions may cause the system to further perform an operation of acquiring the application data from the storage space under the domain name and the additional storage space corresponding to the one sub-domain name when the stored application data is to be loaded into the browser.

The data storage method, device and system according to embodiments of the present disclosure place data, when the storage space corresponding a domain name of a current page that a browser is displaying is insufficient to store the data, into an additional storage space corresponding to a sub-domain name by creating a proxy page corresponding to the sub-domain name under a generic domain name. Since the generic domain name can support an unlimited number of sub-domain names, pages of sub-domain names can be adaptively created according to storage needs, such that the local storage of a browser can meet the data storage demand of various capacities.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present disclosure do not represent all implementations consistent with the disclosure. Instead, they are merely examples of systems and methods consistent with aspects related to the disclosure.

At present, browsers often have a limited local storage space, which can be typically limited according to domain names. Each domain name has a particular maximum storage capacity. However, such capacity limitation is sometimes unable to meet the data storage demand, and in particular, will become a bottleneck for large offline applications to locally store data. The data storage method according to the present application will overcome such capacity limitation on a browser's local storage space, such that the browser can locally store any volume of data and the data storage demand of various capacities can be met.

To achieve the above objective, a domain name of an application can be set to support a generic domain name. A large offline application has a domain name of "*.abc.com" that supports generic domain name resolution. For example, "123.abc.com" or "234.abc.com" can point to the same IP address as "*.abc.com" does. "*" is a wildcard character used to represent one or more characters. This type of domain name (e.g., "*.abc.com"), which has a wildcard character to represent one or more domain names, can be referred to as a generic domain name. The above manner enables the domain name to support an unlimited number of sub-domain names. For example, "123.abc.com," "234.abc.com," and the like are all sub-domain names under the generic domain name "*.abc.com".

Figure 1:
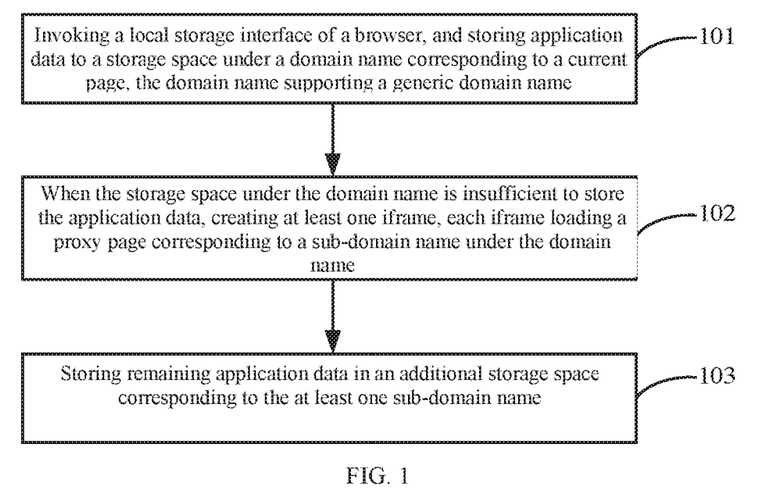
FIG. 1 is a flow chart of a data storage method according to some embodiments of the present disclosure.

On the basis that a domain name is set to support a generic domain name, FIG. 1 is an exemplary flow chart of a data storage method according to the present example. The method can be implemented by an application that needs to store data at the browser locally, for example, implemented by the developed large offline application. As shown in FIG. 1, the method can comprise:

Step 101, invoking a local storage interface of a browser, and storing application data associated with displaying a current page to a storage space under a domain name corresponding to the current page, the domain name supporting a generic domain name.

For example, a local storage interface of the browser can comprise APIs like local Storage, Web SQL, Index DB, and the like. When the browser loads and runs an offline application, the application can invoke a local storage interface provided by the browser and store the application data in a local storage space of the browser.

According to the characteristics of the browser, however, the browser will limit the storage of the application data according to domain names. For example, if a domain name corresponds to a 5 MB storage space, then the application data will be first stored in this storage space. Here, with regard to the application data in this step, an application server can transmit the data required to be loaded by the application to a current page corresponding to the domain name when a user accesses the domain name of the application.

Step 102, when the storage space under the domain name is insufficient to store the application data, creating at least one iframe, each iframe loading a page corresponding to a sub-domain name under the domain name.

For example, the storage space under the domain name corresponding to the current page is insufficient to store the application data due to the limitation on the storage capacity corresponding to the domain name. For example, if there is a total of 10 MB application data, while the upper limit of the storage space under the domain name is 5 MB, then the space cannot accommodate all the application data.

In the present example, the application can create at least one iframe on the current page, each iframe loading a page that can be referred to as a proxy page; moreover, the proxy page corresponds to a sub-domain name under the generic domain name in the step 101. For example, the current page has a domain name of "*.abc.com," and a sub-domain name under the generic domain name created in this step can be "123.abc.com." Other sub-domain names under the generic domain name can also be created, such as "234.abc.com." The domain name can support the generic domain name and therefore can support an unlimited number of sub-domain names.

After the proxy page corresponds to a sub-domain name is created, the sub-domain name will generate a new corresponding local additional storage space according to the characteristic of the browser that "local storage spaces are limited through domain names," which can, for example, still be 5 MB. This is equivalent to the addition of another 5 MB local storage space; and remaining application data can continue to be stored in the local storage space under the sub-domain name.

At this step, the amount of created iframes can be determined according to the data storage demand. For example, if there remains 6 MB application data after the data is stored into a storage space corresponding to the current page in the step 101, then two iframes can be created, each iframe loading a proxy page corresponding to a sub-domain name; assuming that each sub-domain name generates a 5 MB local storage space, then the creation of these two iframes can complete the storage of the application data. For another example, if there remains 12 MB application data in the step 101, then three iframes can be created according to the example above, each iframe loading a proxy page corresponding to a sub-domain name, such that the storage of the application data is completed.

Step 103, storing remaining application data in an additional storage space corresponding to the at least one sub-domain name.

At this step, the remaining application data that has not been stored in the step 101 is stored in a local additional storage space corresponding to the sub-domain name created in the step 102. It should be noted that the flow in FIG. 1 does not limit the sequence in which the steps are executed. For example, when the application needs to create at least two iframes, one iframe can be created by executing the step 102 and the step 103 once, and the data is stored to a storage space of the sub-domain name corresponding to the iframe, and then the step 102 and the step 103 are executed once again to complete the creation of another iframe and the data storage.

The data storage method of the present example can create a plurality of iframes on the current page and introduces pages of sub-domain names corresponding to the iframes, such that the sub-domain names generate respective new storage spaces; moreover, according to the method of the present example, the sub-domain names corresponding to the pages in the iframes are "sub-domain names under a generic domain name." The use of sub-domain names under a generic domain name can achieve a number of extraordinary effects, such as the following three effects:

First, the local storage space of a browser becomes infinite, if not considering the capacity of the storage device;

Since a generic domain name can support an unlimited number of sub-domain names, the local storage space of a browser can be infinitely expanded. For example, an unlimited number of sub-domain names, such as "123.abc.com," "234.abc.com," "456.abc.com," and the like, can be under the generic domain name "*.abc.com," and an unlimited number of pages in iframes can be created according to the data storage demand until the storage space is sufficient to store application data. In this manner, the local storage space of a browser becomes infinite, and the limit by the local storage space of the browser is overcome.

Second, the local storage space of a browser can be flexibly increased;

Since a generic domain name can support an unlimited number of sub-domain names, any sub-domain name under the generic domain name can be allocated to a page embedded in an iframe. Such sub-domain name can be taken at will and the operation is very convenient. In contrast, instead of being created under a generic domain name, if sub-domain names are applied in advance for use by pages in iframes, the operation will become relatively complicated, as all sub-domain names must be applied for prior to use.

Moreover, the manner of applying for several sub-domain names in advance for use is equivalent to customizing the local storage space of a browser, leading to a limited capacity of the storage space. For example, if each sub-domain name corresponds to a 5 MB storage space, a pre-application for three sub-domain names will increase the local storage space of a browser by 15 MB, which is still unable to meet the data storage demand by data greater than this capacity; if five sub-domain names are applied for in advance, the local storage space of the browser will be increased by 25 MB, but data greater than this capacity still can't be stored. Therefore, the local storage space of a browser is not infinite if sub-domain names under a generic domain name are not used, and the storage space is still a storage space having a limited capacity. If the storage space is to be increased, new sub-domain names need to be continuously applied for. As a result, it is not flexible enough to increase the local storage space of a browser.

Third, the local storage space of a browser can satisfy dynamic changes to data storage capacities;

The size of application data may change dynamically. For example, 5 MB data needs to be stored at present. A huge volume of data may be generated in use, and the data storage demand is increased to 20 MB. The manner of using sub-domain names under a generic domain name in the present example can fully meet this type of dynamic data storage demand. Regardless of how much the data is increased, it is simply necessary to flexibly and rapidly increase the number of iframes according to the data size.

A similar comparison can be made with the manner described in the second point above, in which several sub-domain names in advance are applied for to be used by iframes. This manner is relatively static. When the data storage demand changes, the number of sub-domain names that have been applied for in advance becomes insufficient to store application data. Then, several new sub-domain names need to be applied for to meet the increased data storage demand, which is very inflexible.

The method according to some embodiments of the present application provides a manner in which iframes are dynamically created, and new sub-domain names can be introduced dynamically and in real time according to the data storage demand. Namely, iframes of sub-domain names are created in a number as required by data storage, which can adapt to and meet the data storage demand; moreover, the method sets a domain name to support a generic domain name, such that the domain name can have an unlimited number of sub-domain names thereunder. A sub-domain name under the generic domain name can be created at any time according to the data storage demand, leading to very convenient use.

Figure 2:
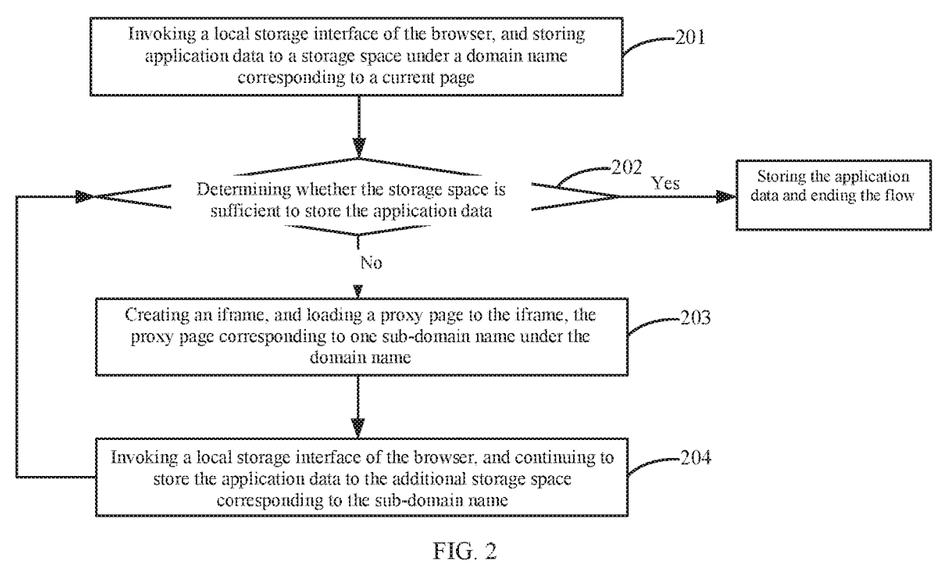
FIG. 2 is a flow chart of another data storage method according to some embodiments of the present disclosure.

FIG. 2 uses an example to describe one application of the data storage method according to some embodiments of the present application. In the present example, it is assumed that the local storage space corresponding to a domain name (or a sub-domain name) is 5 MB, and that the application data to be stored locally at the browser by the current application is 12 MB. The storage flow is as follows:

Step 201, invoking a local storage interface of the browser, and storing application data associated with displaying a current page to a storage space under a domain name corresponding to the current page.

For example, the current page can be referred to as a parent page. The application data can be stored to a local storage space corresponding to a domain name of the parent page through APIs, such as local Storage, Index DB, and the like, provided by the browser.

Step 202, determining whether the storage space under the domain name corresponding to the current page is sufficient to store the application data.

If the determination result is sufficient, the flow can end by simply storing the application data in the storage space corresponding to the domain name of the current page.

In the present example, however, it is assumed that the application data to be stored is 12 MB, and the storage space under the domain name of the current page is 5 MB. Then, the determination result at this step is insufficient, and the step 203 can be executed.

Step 203, creating an iframe, and loading a proxy page to the iframe, the proxy page corresponding to one sub-domain name under the domain name.

For example, an iframe can be created on the current parent page, and a proxy page can be loaded to the iframe. The proxy page can be referred to as a child page. In the present example, moreover, the child page embedded into the created iframe can be set to Not Displayed, so as not to affect the experience of the parent page. For example, the attributes of the child page can be set to hide the page. The child page is created for the purpose of using the storage space under the sub-domain name corresponding to the child page, and the sub-domain name is a sub-domain name under the domain name of the parent page.

In this step, if the creation of a proxy page in the iframe fails, the step 203 is executed again to create an iframe again and introduce a proxy page corresponding to the sub-domain name.

If the creation of a proxy page in the iframe succeeds, the step 204 is executed.

Step 204, invoking a local storage interface of the browser, and continuing to store the application data to the storage space corresponding to the sub-domain name.

For example, when data is stored in the storage space of the parent page in the step 201, the remaining application data that has not been stored will continue to be stored in the storage space of the child page. Data exchange between the parent page and the child page can be that the parent page transmits the application data to the child page so as to store the application data in the storage space of the child page; and the application data is transmitted from the current parent page to the child page corresponding to the sub-domain name. There are many ways to set domain-crossing data transmission. For example, one of the ways can be using postMessage API.

An example of creating an iframe to introduce a proxy page is shown below:
   creating an iframe
   var iframeNode=document.createElement("iframe")
   The address of a child page in the created iframe is
   iframe.src="http://x.alipay.net/proxy.htm
   The parent page invokes the child page to transmit the application data to the child page for storage.
   document.appendChild(iframeNode)

In this step, when the application data is stored in the storage space under the sub-domain name, whether the storage space corresponding to the sub-domain name is sufficient to store the application data can continue to be determined, i.e., the operation can return to and execute the step 202. If the child page in the created iframe is sufficient, the flow can end; if the storage space is still insufficient to store the application data, the step 203 is executed to create a new iframe and introduce a proxy page corresponding to another new sub-domain name, until the storage space is sufficient to store the application data, and then no more iframe is created. In the present example, two iframes need to be created to store the 12 MB application data, and each iframe loads a proxy page under one sub-domain name.

Unlike the foregoing determining whether the storage space is sufficient to store the application data every time when an iframe is created, an amount of iframes to be created can be calculated in advance according to the size of the application data in the present example; the amount of iframes is created, and one page is loaded to each of the iframes, each of the pages corresponding to one sub-domain name under the generic domain name corresponding to each of the pages. For example, it is assumed that the size of the application data is 12 MB, and the storage space corresponding to each sub-domain name is 5 MB. Then, iframes need to be created to store 7 MB data after the 5 MB storage space of the current page is used. The 7 MB data demands the creation of two iframes, a page corresponding to the sub-domain name under the generic domain name is loaded to each iframe, and two sub-domain names can generate a total of 10 MB storage space, which is sufficient to store the 7 MB remaining application data.

It can be seen from the description above that, when the application data is stored locally at the browser, iframes can be created dynamically according to the data storage demand. For example, if two iframes need to be created to store data, then two iframes will be created; if six iframes need to be created to store data, then six iframes will be created. In this way, the data storage will not be limited by the storage capacity of the domain name of a browser, and the data storage demand of any size can be met; moreover, an unlimited number of sub-domain names can be supported by setting a generic domain name. Sub-domain names can be created whenever needed, and there is no need to apply for an additional domain name, leading to convenient use.

In addition, when the application data has been stored and the data is used next time, for example, the stored application data needs to be re-loaded into a browser when an offline application is loaded and run in the offline state, the application data can be acquired from the storage space under the domain name and the storage space corresponding to the at least one sub-domain name, respectively. Here, a child page can invoke a function of the parent page through the postMesage function to transmit the application data stored on the child page (i.e., the data stored in the storage space under a sub-domain name corresponding to the child page) to the parent page, and the application data is displayed in a unified manner on the parent page.

In addition, the above example uses the domain name of the current page as a generic domain name, and the page loaded in the iframe corresponds to a sub-domain name under the generic domain name. This is merely an example, and specific implementations are not limited thereby. For example, a page in a created iframe still corresponds to a sub-domain name under a generic domain name, but the generic domain name does not correspond to a domain name of the current page. Namely, the domain name of the current page and the generic domain name above have different upper level domains.

For example, if the domain name of the current page is www.123.com and the storage space under the domain name of the page is insufficient to store the application data, an iframe is created, and the page loaded to the iframe corresponds to a sub-domain name under a generic domain name. The generic domain name can be *.abc.com, and one sub-domain name under the generic domain name can be 456.abc.com. In this case, the domain name of the current page does not correspond to the generic domain name corresponding to the page in the iframe, but unlimited expansion can be achieved since what is created is still a page corresponding to a sub-domain name under a generic domain name, and the same effect as that of the example above can be achieved. Namely, a data storage demand of any size can be met.

Figure 3:
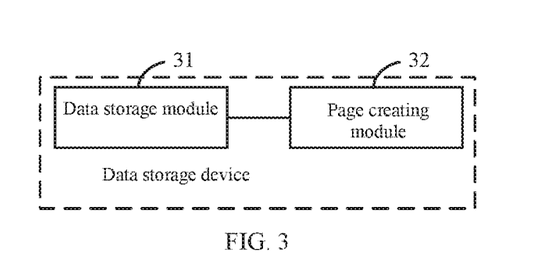
FIG. 3 is a schematic structural diagram of a data storage device according to some embodiments of the present disclosure.

To implement the above data storage method, a data storage device is further provided in some embodiments of the present disclosure, as shown in the following brief description of the structure of the device. Please refer to the method embodiment for detailed working principle thereof. As shown in FIG. 3, the device may comprise a data storage module 31 and a page creating module 32.

The data storage module 31 is configured to invoke a local storage interface of a browser, and store application data associated with displaying a current page to a storage space under a domain name corresponding to the current page; when the storage space under the domain name is insufficient to store the application data, the data storage module is further configured to store remaining application data to a storage space corresponding to the at least one sub-domain name created by a page creating module; and the page creating module 32 is configured to create, when the storage space under the domain name is insufficient to store the application data, at least one HTML frame (iframe), each iframe loading a page corresponding to a sub-domain name under a generic domain name.

In one example, the page creating module 32 is configured to determine whether the storage space under the domain name corresponding to the current page is sufficient to store the application data; if the determination result is insufficient, create an iframe, and load a proxy page to the iframe, the proxy page corresponding to one sub-domain name under the domain name; when the storage space corresponding to the sub-domain name is still insufficient to store the application data, create a new iframe and load to the iframe a proxy page corresponding to another sub-domain name under the domain name.

In one example, the page creating module 32 is configured to calculate an amount of iframes to be created according to the size of the application data; and create the amount of iframes, and load a proxy page to each of the iframes, each of the pages corresponding to one sub-domain name under the generic domain name.

In one example, the data storage module 31 is configured to store remaining application data to a storage space corresponding to the at least one sub-domain name, which comprises: setting the page corresponding to the sub-domain name and the current page corresponding to the domain name in the same domain; and transmitting the application data from the current page to the page corresponding to the sub-domain name.

Figure 4:
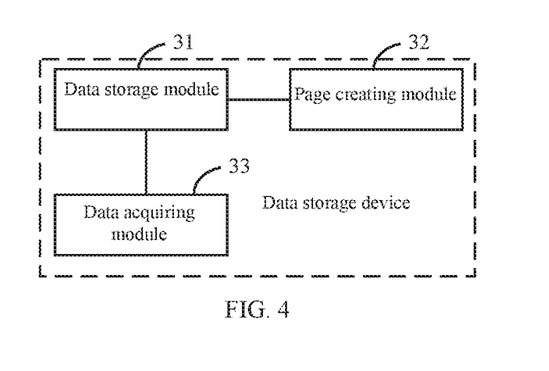
FIG. 4 is a schematic structural diagram of another data storage device according to some embodiments of the present disclosure.

In one example, as shown in FIG. 4, the device may further comprise a data acquiring module 33 configured to acquire the application data from the storage space under the domain name and the storage space corresponding to the at least one sub-domain name, respectively, when the stored application data is loaded into the browser.

In one example, the generic domain name corresponds to the domain name of the current page (e.g., having the same upper level domain); alternatively, the generic domain name does not correspond to the domain name of the current page (e.g., having different upper level domain).

Only preferred embodiments of the present disclosure are described above, and the embodiments are not used to limit the present disclosure. Any modifications, equivalent substitutions, or improvements made within the spirit and principle of the present disclosure shall all fall within the scope of the present disclosure.

Another aspect of the disclosure is directed to a non-transitory computer-readable storage medium storing instructions executable by one or more processors to cause the one or more processors to perform the methods, as discussed above. The one or more processors can be coupled to the computer-readable storage medium to receive the instructions. The computer-readable storage medium may include volatile or non-volatile, magnetic, semiconductor, tape, optical, removable, non-removable, or other types of computer-readable storage medium or computer-readable storage devices. In some embodiments, the computer-readable storage medium may be a disc or a flash drive having the computer instructions stored thereon.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to execute software instructions stored in the computer-readable storage medium to perform the specialized functions of the modules/units.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present disclosure is not limited to the exact construction that has been described above and illustrated in the accompanying drawings, and that various modifications and changes can be made without departing from the scope thereof. It is intended that the scope of the disclosure should only be limited by the appended claims.

What is claimed is:

1. A data storage method, comprising:
   invoking a storage interface of a browser, and storing application data associated with displaying a page by the browser to a storage space under a domain name corresponding to the page, the domain name including a first root domain name;
   when the storage space under the domain name is insufficient to store the application data, creating at least one HTML frame (iframe) under a generic domain name that includes a second root domain name different from the first root domain name, each iframe loading one proxy page, each proxy page corresponding to one sub-domain name under the generic domain name, by:
creating a first iframe, the first iframe loading a first proxy page, the first proxy page corresponding to a first sub-domain name under the generic domain name; and
in response to determining that a first additional storage space corresponding to the first sub-domain name is still insufficient to store the remaining application data, creating a second iframe, the second iframe loading a second proxy page corresponding to a second sub-domain name under the generic domain name; and
storing remaining application data in an additional storage space corresponding to the one sub-domain name.

2. The method according to claim 1, wherein a size of the application data changes during displaying the page, and creating at least one HTML frame (iframe) comprises creating a number of iframes corresponding to a change of the size of the application data.

3. The method according to claim 1, wherein the creating at least one HTML frame (iframe), each iframe loading one proxy page, each proxy page corresponding to one sub-domain name under the generic domain name comprises:
calculating a number of iframes to be created according to a size of the application data; and
creating the number of iframes, and loading one proxy page to each of the created iframes, each proxy page corresponding to one sub-domain name under the generic domain name.

4. The method according to claim 3, wherein the size of the application data changes during displaying the page, and the number of iframes are created corresponding to a change of the size of the application data.

5. The method according to claim 1, further comprising:
acquiring the application data from the storage space under the domain name and the additional storage space corresponding to the one sub-domain name when the stored application data is to be loaded into the browser.

6. The method according to claim 1, wherein the storage space has a size same as that of the additional storage space.

7. One or more non-transitory computer-readable storage media, storing instructions executable by one or more processors to cause the one or more processors to perform operations comprising:
invoking a storage interface of a browser, and storing application data associated with displaying a page by the browser to a storage space under a domain name corresponding to the page, the domain name including a first root domain name;
when the storage space under the domain name is insufficient to store the application data, creating at least one HTML frame (iframe) under a generic domain name having a second root domain name different from the first root domain name, each iframe loading one proxy page, each proxy page corresponding to one sub-domain name under the generic domain name, by:
creating a first iframe, the first iframe loading a first proxy page, the first proxy page corresponding to a first sub-domain name under the generic domain name; and
in response to determining that a first additional storage space corresponding to the first sub-domain name is still insufficient to store the remaining application data, creating a second iframe, the second iframe loading a second proxy page corresponding to a second sub-domain name under the generic domain name; and
storing remaining application data in an additional storage space corresponding to the one sub-domain name.

8. The storage media according to claim 7, wherein a size of the application data changes during displaying the page, and creating at least one HTML frame (iframe) comprises creating a number of iframes corresponding to a change of the size of the application data.

9. The storage media according to claim 7, wherein the creating at least one HTML frame (iframe), each iframe loading one proxy page, each proxy page corresponding to one sub-domain name under the generic domain name comprises:
calculating a number of iframes to be created according to a size of the application data; and
creating the number of iframes, and loading one proxy page to each of the created iframes, each proxy page corresponding to one sub-domain name under the generic domain name.

10. The storage media according to claim 9, wherein the size of the application data changes during displaying the page, and the number of iframes are created corresponding to a change of the size of the application data.

11. The storage media according to claim 7, the operations further comprise:
acquiring the application data from the storage space under the domain name and the additional storage space corresponding to the one sub-domain name when the stored application data is to be loaded into the browser.

12. The storage media according to claim 7, wherein the storage space has a size same as that of the additional storage space.

13. A data storage system, comprising a processor and a non-transitory computer-readable storage medium coupled to the processor and having instructions stored thereon, the instructions being executable by the processor to cause the processor to perform operations comprising:
invoking a storage interface of a browser, and storing application data associated with displaying a page by the browser to a storage space under a domain name corresponding to the page, the domain name including a first root domain name;
when the storage space under the domain name is insufficient to store the application data, creating at least one HTML frame (iframe) under a generic domain name having a second root domain name different from the first root domain name, each iframe loading one proxy page, each proxy page corresponding to one sub-domain name under the generic domain name, by:
creating a first iframe, the first iframe loading a first proxy page, the first proxy page corresponding to a first sub-domain name under the generic domain name; and
in response to determining that a first additional storage space corresponding to the first sub-domain name is still insufficient to store the remaining application data, creating a second iframe, the second iframe loading a second proxy page corresponding to a second sub-domain name under the generic domain name; and
storing remaining application data in an additional storage space corresponding to the one sub-domain name.

14. The system according to claim 13, wherein a size of the application data changes during displaying the page, and creating at least one HTML frame (iframe) comprises creating a number of iframes corresponding to a change of the size of the application data.

15. The system according to claim 13, wherein the creating at least one HTML frame (iframe), each iframe loading one proxy page, each proxy page corresponding to one sub-domain name under the generic domain name comprises:
- calculating a number of iframes to be created according to a size of the application data; and
- creating the number of iframes, and loading one proxy page to each of the created iframes, each proxy page corresponding to one sub-domain name under the generic domain name.

16. The system according to claim 13, wherein the operations further comprise:
- acquiring the application data from the storage space under the domain name and the additional storage space corresponding to the one sub-domain name when the stored application data is to be loaded into the browser.

17. The system according to claim 15, wherein the size of the application data changes during displaying the page, and the number of iframes are created corresponding to a change of the size of the application data.

* * * * *